Aug. 13, 1929.  C. A. SAWTELLE  1,724,148
BRAKE
Filed June 15, 1925    2 Sheets-Sheet 1

INVENTOR.
CHARLES A. SAWTELLE
BY
ATTORNEYS

Aug. 13, 1929.  C. A. SAWTELLE  1,724,148
BRAKE
Filed June 15, 1925  2 Sheets-Sheet 2

INVENTOR.
CHARLES A. SAWTELLE
BY
ATTORNEYS

Patented Aug. 13, 1929.

1,724,148

UNITED STATES PATENT OFFICE.

CHARLES A. SAWTELLE, OF DETROIT, MICHIGAN, ASSIGNOR TO PERFECTION ENGINEERING COMPANY, OF DETROIT, MICHIGAN, A CORPORATION OF MICHIGAN.

BRAKE.

Application filed June 15, 1925. Serial No. 37,298.

This invention relates to vehicle brakes and more particularly to brakes for the front wheels of motor vehicles.

I have found that in the ordinary use of four wheel brakes the inside front steering wheel tends to bind after it has been turned beyond a certain angle such as 10 to 15° in some types of brakes. This cramping of the inside wheel is due in part, to the fact that the steering wheels in accordance with the usual practice are mounted on an axis for swivelling which causes the steering wheels to rotate around an axis which is not vertical. Further, it is common practice in the steering wheel art to incline the inside wheel on making a turn to a greater extent than the outside wheel which, in effect, tends to bind the inside wheel so as to resist movement. When a braking force is applied to the steering wheels and these wheels are turned to a steering position, the binding or cramping of the inside wheel is further pronounced by reason of the braking force being applied. The outside wheel on the other hand operates on a greater radius and will stand a greater braking force during its steering positions.

It is an object of my invention to provide means for relieving the braking force applied to the inside steering wheel after the wheel has been turned a predetermined amount beyond the straight ahead position. I have further provided means for permitting the outside wheel to be turned without relieving or increasing the braking force applied to this wheel. A further feature of my invention resides in the provision of means for compensating for the movement of the wheel about the inclined axis of swivelling so that the braking force applied to the outside wheel remains constant as the outside wheel is moved to its steering positions.

A further feature of my invention resides in the provision of a brake construction in which the cam action is independent of the brake shoe action whereby the shoes are prevented from getting out of alignment when the wheels are turned.

With these and other objects in view, the invention resides in the novel features of construction and combination and arrangements of parts as more fully hereinafter described and claimed.

In the drawings:

Figure 3 is a fragmentary view through the line 3—3 of Figure 2;

Figure 1:
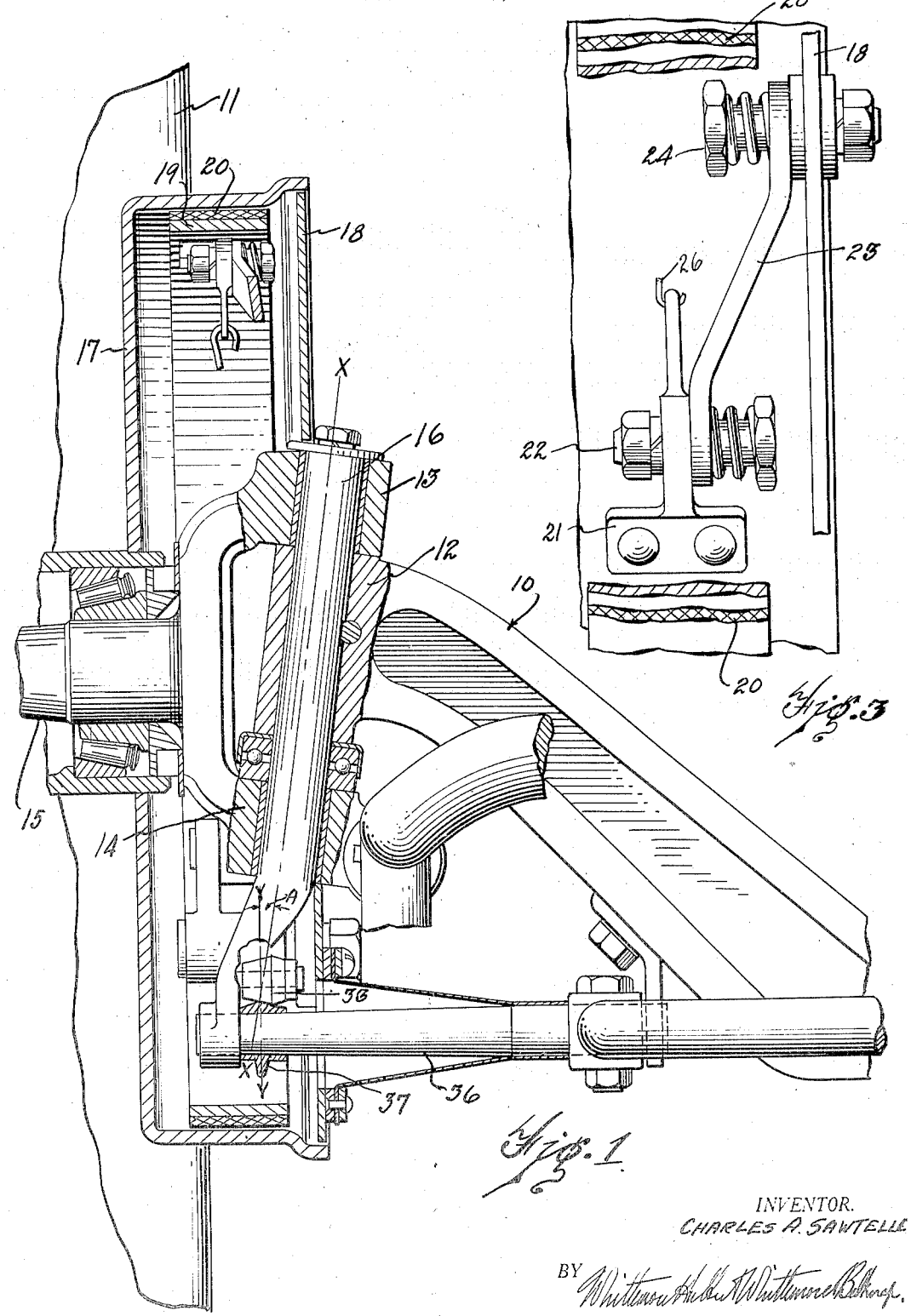
Figure 1 is a vertical section view through one of the steering wheels.
Figure 2:
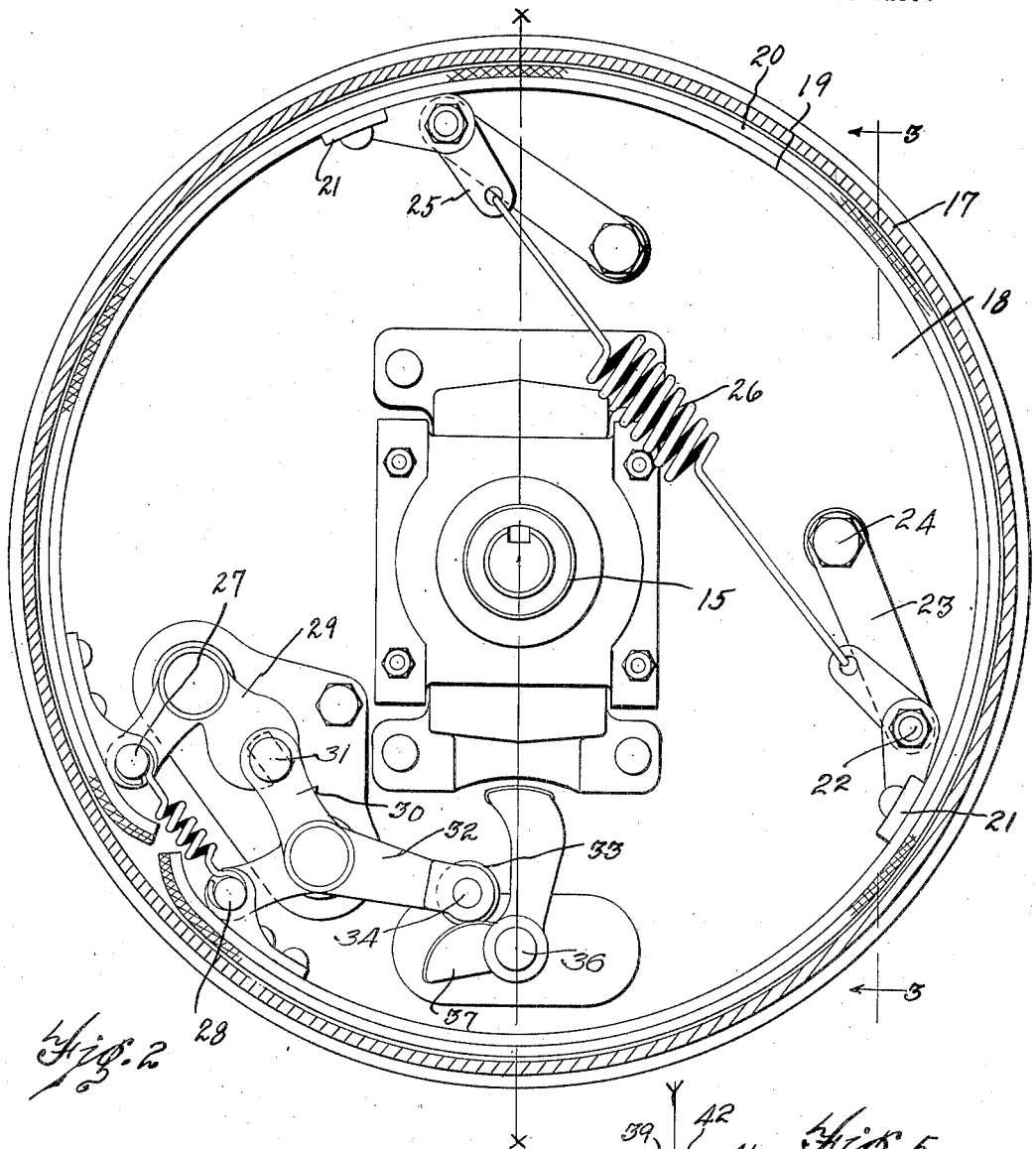
Figure 2 is an elevation view of the same.

Referring to the drawings in which like reference characters indicate corresponding parts, reference character 10 designates the front axle of a motor vehicle and 11 is one of the ground wheels mounting said axle, one of the wheels being shown for purposes of illustration. Each front wheel 11 is adapted to swivel upon the axle 10 for steering purposes following general practice by forming the axle terminally with a bearing 12 arranged between spaced upper and lower bearings 13 and 14 respectively. 15 indicates a spindle preferably integral with the bearings 13 and 14 on which spindle the wheel 11 is journaled, the bearings 13 and 14 being connected by a king pin 16. $x$—$x$ indicates the axis of swivelling of the king pin 16 and hence the wheel 11. 17 is a brake drum rigidly secured to the wheel 11 by any suitable means. 18 is a relatively stationary metal plate mounted to swivel with the wheel 11 and adapted to form a closure for the brake drum 17. The plate 18 further carries a brake band 19 and certain actuating parts for the same described hereinafter. The band 19 is provided with the customary brake lining 20 of fabric or other suitable material. The ends of the brake band preferably approach each other within the lower portion of the drum, the circumferential extent of the band being only slightly less than 360°. The upper portion of the band is supported and guided at two points appropriately removed from each other and from the extremities of said band. Each supporting and guiding device comprises a bracket 21 adapted to be secured to the brake band, the bracket 21 carrying a pivot pin 22 upon which is pivotally mounted an arm 23 pivotally secured at one end to a pin 24 carried by the plate 18. The brackets 21 are preferably provided with arms 25 extending inwardly toward each other and connected by a tension spring 26. The positioning of the links of arms 23 is such as to provide for the same movement of all of the portions of the brake band toward and from the brake drum. If desired the brake band may be formed of suitable material whereby it will tend to contract away from the brake drum upon release of the actuating cam for expanding the band into engagement with the drum. The movement of the band away from the drum may be further effected by the spring 26 which is so arranged with respect to the pivot pins 24 so as to offer a decreasing contracting effort for the brake band as the band is expanded into engagement with the brake drum. The adjacent lower ends of the band 19 are pivoted at 27 and 28 respectively to the bell crank levers 29 and 30, which are intermediately pivoted upon bolts rigidly carried by the plate 18. The bell cranks also preferably have arms projecting toward each other and pivotally connected as indicated at 31. One of the bell cranks is preferably provided with an integral lever arm 32 extending in the direction of the axis of swivelling $x$—$x$. This lever arm is preferably provided at its end with a cam actuated member or roller 33 mounted to rotate on a pin 34 carried by the lever arm 32.

36 indicates a rock shaft adapted to receive a rocking movement by any suitable mechanism (not shown) for imparting a like movement to a cam 37 mounted thereon. $y$—$y$ indicates the vertical axis of the roller 33 which preferably intersects the projected axis of swivelling $x$—$x$ at substantially the center of the roller as indicated in Figure 1.

Figure 4:
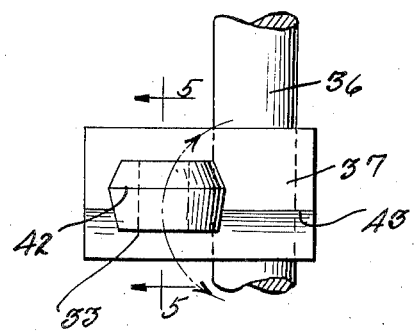
Figure 4 is a plan view showing in detail the cam and cam actuated member.
Figure 5:
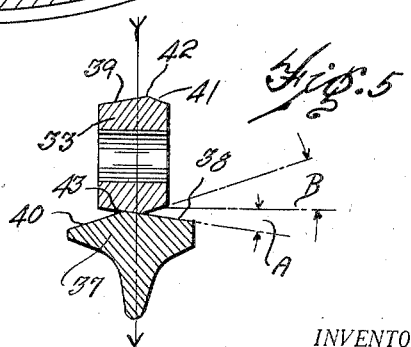
Figure 5 is a sectional elevation view through 5—5 of Figure 4.

It will be apparent that as the steering wheels are turned from the straight ahead position as indicated at Figure 1, the wheel 11 and also the cam actuated roller 33 will not be rotated about a true vertical axis, but rather about the inclined axis of swivelling $x$—$x$. By reason of this construction, the roller 33 will be moved transversely of the cam 37 and depending upon the direction of movement of the wheel will either tend to leave the face of the cam, or to move against the face of the cam. For example, in Figure 1, the left front steering wheel is shown for purposes of illustration. When this wheel is moved toward the right as in making a right turn, the roller 33 would be carried to the right across the face of the cam and also downwardly which were it not for my invention would tend to raise the roller 33 and increase the braking force applied to the wheel. Also for a left turn, the roller 33 will be carried transversely of the cam 37 and to the left thereof, which because of the inclination of the axis $x$—$x$ would tend to lower the roller 33 resulting in a relieving of the braking force applied to the wheel 11. One of the objects of my invention is to provide a construction whereby as the steering wheels are turned, compensation will be made for the inclination of the swivelling axis so that the braking force applied to the outside wheel will be unchanged and the braking force applied to the inside wheel will be relieved after a predetermined steering movement. Referring to Figures 4 and 5, I have shown one construction for accomplishing this effect. The cam 37 is preferably provided with a portion of its face inclined transversely as indicated at 38, the angle of inclination being indicated at A. This angle is preferably the same as the angle between the axes $y$—$y$ and $x$—$x$ as illustrated in Figure 1. Likewise the cam actuated member or roller 33 is provided with a portion of its face transversely inclined at 39 to correspond with the inclination of the cam portion 38. The cam 37 is also provided with a portion 40 oppositely inclined transversely of the cam, the angle of inclination of the portion 40 with the horizontal being indicated as the angle B. Likewise, the cam actuated member 33 is provided with an oppositely inclined transverse portion 41 corresponding to the inclination of the cam portion 40. When the parts are arranged as shown in Figures 4 and 5, the wheel 11 is in its straight ahead position. When the wheel is turned as for a steering movement to the right, the roller 39 is moved transversely to the right across the face of cam 37, the inclined portions 38 and 39 being in engagement with each other. Since the angle A is the same as the angle between the axes $y$—$y$ and $x$—$x$ the roller 33 and hence the lever arm 32 will not be moved either away from or toward the cam during this movement of the wheel 11 resulting in a uniform braking being applied to the wheel. When the wheel 11 is moved for steering the vehicle toward the left, the roller 33 will be carried to the left transversely of the cam 37 until the inclined portions 38 and 39 remaining in engagement and compensating for the inclination of the axis $x$—$x$ and the peak point 42 of the roller passes the peak 43 of the cam. At this point, the portions 41 and 40 of the roller and cam are brought into engagement and since the angle of inclination of these portions as indicated at B is substantially great, the roller 33 and hence the lever arm 32 will be allowed to drop downwardly in proportion to the amount of turning whereby the braking force applied to the wheel through the bell crank levers will be relieved or diminished. In turning the wheel in this direction, it will be noted that the braking force is unchanged for a predetermined distance corresponding to the movement of the peak point 42 of the roller to the peak point 43 of the cam, this movement corresponding, for example, to 10° or 15° of movement of the wheel 11 beyond the straight ahead steering position.

While I have shown only one of the steering wheels, it should be understood that the other is similarly constructed to operate in a corresponding manner with that described in connection with the wheel 11.

Instead of providing a roller on the end of the lever arm 32, the roller could be dispensed with without departing from the spirit of my invention and the lever arm itself could be formed into the cam actuated member. Furthermore, I do not desire to limit my invention to any particular system of levers for operating the brake band as various systems of levers may be used for actuating the brakes from the cam. Also, the inclined portions of the cam and cam engaging members may be varied to conform with any desired construction of wheel and to afford releasing of either the inside or outside steering wheel at any desired position of the steering wheels.

While it is believed that from the foregoing description, the nature and advantage of my invention will be readily understood, I desire to have it understood that I do not limit myself to what is herein shown and described and that such changes may be resorted to when desired as fall within the scope of the claims.

What I claim as my invention is:—

1. The combination with a vehicle wheel swivelled for steering movement and provided with a brake drum, of means for applying a braking force to said drum including a brake band, a rock shaft, a cam actuated by the rock shaft, a cam actuated member connected to actuate the brake band and mounted to move transversely of the cam about the axis of swivelling of the wheel, means whereby upon movement of the cam the braking force applied thereby is unchanged for a steering movement of the wheel in one direction of rotation about its axis of swivelling, but is automatically relieved a predetermined amount upon a steering movement in the opposite direction, the relief of the braking force being effective only after the wheel has been moved a predetermined amount beyond the straight ahead position.

2. The combination with a vehicle wheel swivelled for steering movement, of means for braking said wheel including a rock shaft, a cam member mounted on said rock shaft and actuated thereby, a cam actuated member connected to actuate said braking means and mounted to move transversely of the cam about the axis of swivelling of the wheel, said cam having a portion of its face inclined transversely of the cam to relieve the braking force applied to the wheel upon a swivelling of the wheel in one direction only.

3. The combination with a vehicle wheel swivelled for steering movement, of means for braking said wheel including a rock shaft, a cam member mounted on said rock shaft and actuated thereby, a cam actuated member connected to actuate said braking means and mounted to move transversely of the cam about the axis of swivelling of the wheel, said cam having a portion of its face inclined transversely of the cam so as to become effective only after the wheel has been moved a predetermined amount beyond the straight ahead position to relieve the braking force applied to the wheel.

4. The combination with a vehicle wheel swivelled for steering movement, of means for braking said wheel including a rock shaft, a cam member mounted on said rock shaft and actuated thereby, a cam actuated member connected to actuate said braking means and mounted to move transversely of the cam about the axis of swivelling of the wheel, said cam having a portion of its face inclined in one direction transversely of the cam so as to become effective only after the wheel has been moved a predetermined amount beyond the straight ahead position to relieve the braking force applied to the wheel, said cam also having a portion of its face inclined in a direction opposite with the inclination of the first said portion for permitting the application of a constant braking force applied to the wheel as the wheel is moved beyond the straight ahead position in the opposite direction from that aforesaid.

5. The combination with a vehicle wheel swivelled for steering movement, of means for braking said wheel including a rock shaft, a cam member mounted on said rock shaft and actuated thereby, a cam actuated member connected to actuate said braking means and mounted to move transversely of the cam about the axis of swivelling of the wheel, said cam having a portion of its face inclined in one direction transversely of the cam so as to become effective only after the wheel has been moved a predetermined amount beyond the straight ahead position to relieve the braking force applied to the wheel, said cam also having a portion of its face inclined in a direction opposite with the inclination of the first said portion for permitting the application of a constant braking force applied to the wheel as the wheel is moved beyond the straight ahead position in the opposite direction from that aforesaid, said cam actuated member being provided with cam engaging portions respectively inclined for engagement with the said inclined portions of the cam.

6. The combination with a vehicle wheel swivelled for steering movement, of means for braking said wheel including a rock shaft, a cam member mounted on said rock shaft and actuated thereby, a cam actuated member connected to actuate said braking means and mounted to move transversely of the cam about the axis of swivelling of the wheel, said cam having a portion of its face inclined transversely of the cam, said cam actuated member being provided with a cam engaging portion inclined for engagement with the said inclined portion of the cam for engagement therewith to relieve the braking force applied to the wheel.

7. The combination with a vehicle wheel swivelled for steering movement, of means for applying a braking force to said wheel including a cam member and a cam actuated member, one of said members being provided with a portion inclined an amount to compensate for the movement of the cam actuated member about the axis of swivelling permitting the application of a constant braking force applied to the wheel as the wheel is moved beyond the straight ahead position.

8. The combination with a vehicle wheel swivelled for steering movement, of means for applying a braking force to said wheel including a cam member and a cam actuated member, one of said members being provided with means for compensating for the movement of the cam actuated member about the axis of swivelling permitting the application of a constant braking force applied to the wheel as the wheel is moved beyond the straight ahead position.

9. The combination with a vehicle wheel swivelled for steering movement, of means for braking said wheel including a rock shaft, a cam member mounted on said rock shaft and actuated thereby, a cam actuated member connected to actuate said braking means and mounted to move transversely of the cam about the axis of swivelling of the wheel, said cam actuated member having a portion of its face transversely inclined to relieve the braking force applied to the wheel.

10. The combination with a vehicle wheel swivelled for steering movement, of means for braking said wheel including a rock shaft, a cam member mounted on said rock shaft and actuated thereby, a cam actuated member connected to actuate said braking means and mounted to move transversely of the cam about the axis of swivelling of the wheel, said cam actuated member having a portion of its face transversely inclined so as to become effective only after the wheel has been moved a predetermined amount beyond the straight ahead position to relieve the braking force applied to the wheel.

11. The combination with a vehicle wheel swivelled for steering movement, of means for braking said wheel including a rock shaft, a cam member mounted on said rock shaft and actuated thereby, a cam actuated member connected to actuate said braking means and mounted to move transversely of the cam about the axis of swivelling of the wheel, said cam actuated member having a portion of its face transversely inclined in one direction so as to become effective only after the wheel has been moved a predetermined amount beyond the straight ahead position to relieve the braking force applied to the wheel, said cam actuated member also having a portion of its face inclined in a direction opposite with the inclination of the first said portion for permitting application of a constant braking force applied to the wheel as the wheel is moved beyond the straight ahead position in the direction opposite from that aforesaid.

12. The combination with a vehicle wheel swivelled for steering movement, of means for braking said axle including a brake drum, a brake band engageable with the drum, bell crank levers, each having an end engageable with the respective ends of the brake band, said bell crank levers being connected to move together, a rock shaft, a cam member mounted on said rock shaft, one of said bell crank levers being provided with a lever arm, a cam actuated member carried by the lever arm and adapted to move transversely of the cam as the wheel is moved to a steering position, one of said members being provided with a portion inclined an amount to compensate for the movement of the cam actuated member about the axis of swivelling permitting the application of a constant braking force applied to the wheel as the wheel is moved beyond the straight ahead position.

13. The combination with a vehicle wheel swivelled for steering movement, of means for braking said axle including a brake drum, a brake band engageable with the drum, bell crank levers, each having an end engageable with the respective ends of the brake band, said bell crank levers being connected to move together, a rock shaft, a cam member mounted on said rock shaft, one of said bell crank levers being provided with a lever arm, a cam actuated member carried by the lever arm and adapted to move transversely of the cam as the wheel is moved to a steering position, one of said members being provided with a portion of its face transversely inclined so as to become effective only after the wheel has been moved a predetermined amount beyond the straight ahead position to relieve the braking force applied to the wheel.

14. The combination with a vehicle wheel swivelled for steering movement, of means for braking said wheel including a brake drum, a brake band engageable with the drum, bell crank levers each having an end engageable with the respective ends of the brake band, said bell crank levers being connected to move together, a rock shaft, a cam member mounted on said rock shaft, one of said bell crank levers being provided with a lever arm, a cam actuated member carried by the lever arm and adapted to move transversely of the cam, as the wheel is moved to a steering position, one of said members being provided with a portion of its face transversely inclined to relieve the braking force applied to the wheel.

15. The combination with a vehicle wheel swivelled for steering movement, of means for braking said wheel including a rock shaft, a cam member mounted on said rock shaft and actuated thereby, a cam actuated member connected to actuate said braking means and mounted to move transversely of the cam about the axis of swivelling of the wheel, one of said members being provided with a portion of its face transversely inclined to relieve the braking force applied to the wheel.

16. The combination with a vehicle wheel swivelled for steering movement about an axis inclined with the vertical, means for braking said wheel and means associated with the braking means compensating for the movement of the wheel about the inclined axis whereby the braking force applied to the wheel is unchanged for a steering movement of the wheel up to a predetermined point, and means for relieving the braking force beyond said point for a further steering movement of the wheel.

In testimony whereof I affix my signature.

CHARLES A. SAWTELLE.